United States Patent
Colombo et al.

(10) Patent No.: US 9,683,623 B2
(45) Date of Patent: Jun. 20, 2017

(54) PRESSURE VALVE FOR GAS SPRING

(71) Applicant: GM GLOBAL TECHNOLOGY OPERATIONS LLC, Detroit, MI (US)

(72) Inventors: Joel Colombo, Howell, MI (US); Michael P. Balogh, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/681,518

(22) Filed: Apr. 8, 2015

(65) Prior Publication Data

US 2016/0298711 A1    Oct. 13, 2016

(51) Int. Cl.
*F16F 5/00*   (2006.01)
*F16F 9/02*   (2006.01)
(Continued)

(52) U.S. Cl.
CPC .......... *F16F 9/0218* (2013.01); *E05F 1/1091* (2013.01); *F16F 9/0281* (2013.01);
(Continued)

(58) Field of Classification Search
CPC .......... F16F 9/02; F16F 9/0209; F16F 9/0218; F16F 9/0281; F16F 9/0227; F16F 9/52; F16F 9/523; F16F 9/526; F16F 9/3235; F16F 9/365; F16F 9/431; F16F 2230/06; F16F 2230/24; F16F 9/064; F16F 9/065; F16F 9/066; F16F 9/067
See application file for complete search history.

(56) References Cited

U.S. PATENT DOCUMENTS 3,995,842 A * 12/1976 Freitag .................. F16F 9/0218
                                                188/376
4,408,751 A * 10/1983 Dodson ..................... F16F 9/52
                                                188/277
(Continued)

FOREIGN PATENT DOCUMENTS

DE        8906615 U1 *  7/1989 ............... A47C 3/30
DE    102004034706 B3 *  2/2006 ........... F16F 9/0218
JP       49070384 U  *  6/1974

OTHER PUBLICATIONS

Partial Machine Translation of JP 49070384 (no date).*
Machine Translation of DE 8906615 (no date).*
Machine Translation of DE 102004034706 (no date).*

*Primary Examiner* — Nicholas J Lane
(74) *Attorney, Agent, or Firm* — Cantor Colburn LLP

(57)    ABSTRACT

A pneumatic spring strut assembly comprises a cylinder comprising a working end and a boosting chamber. The working end includes a first volume of gas and the boosting chamber includes a second volume of gas. A temperature control valve assembly is disposed in the interior volume separating the working end from the boosting chamber and includes an over-pressure valve configured to release the second volume of gas into the working end when the pressure within the boosting chamber increases above the normal pressure range of operation. A valve is disposed in the wall of the cylinder, in the working end thereof, and is configured to yield, to thereby vent the first volume of gas to atmosphere, when the pressure within the interior volume of the working end increases above the normal pressure range of operation.

7 Claims, 3 Drawing Sheets

(51) Int. Cl.
*F16F 9/32* (2006.01)
*F16F 9/34* (2006.01)
*F16F 9/52* (2006.01)
*E05F 1/10* (2006.01)

(52) U.S. Cl.
CPC .............. *F16F 9/3235* (2013.01); *F16F 9/34* (2013.01); *F16F 9/526* (2013.01); *E05Y 2800/414* (2013.01); *E05Y 2900/546* (2013.01)

(56) References Cited

U.S. PATENT DOCUMENTS

| | | | | |
|---|---|---|---|---|
| 5,722,643 | A * | 3/1998 | Chamberlin | F16F 9/02 188/277 |
| 6,959,921 | B2 * | 11/2005 | Rose | F16F 9/526 188/300 |
| 7,484,720 | B2 * | 2/2009 | Lange | F16F 9/0227 188/300 |
| 9,416,570 | B1 * | 8/2016 | Colombo | F16F 13/002 |
| 2016/0201754 | A1 * | 7/2016 | Colombo | F16F 9/526 188/277 |

\* cited by examiner

PRESSURE VALVE FOR GAS SPRING

FIELD OF THE INVENTION

The subject of the invention is related to multi-chamber, temperature compensated pneumatic spring struts and, more particularly, to a temperature compensating pneumatic spring strut having over-pressure compensation.

BACKGROUND

Pneumatic spring struts (gas springs) are widely used to either partly or totally counterbalance engine compartment hoods, trunk lids, rear windows and tailgates of vehicles to facilitate opening them and to hold them open. The force outputs of gas springs may vary considerably with ambient temperature changes. That is, at low ambient temperatures the gas spring produces a force that can be significantly lower than the force produced at higher ambient temperatures. To offset this effect a temperature compensating valve (TCV) assembly is assembled into pneumatic spring strut bodies. The TCV assembly separates the gas chamber of the gas spring into two separate pressure chambers. When the valve is closed, the gas spring functions only using an output, or lift force, based on the volume of gas in a main pressure chamber. At colder ambient temperatures the valve opens, allowing the gas spring to operate and provide an output, or lift force, based on the volume of gas in the main pressure chamber and an additional volume contained in a secondary pressure chamber.

In some cases, such as following damage to the vehicle following a crash, the pneumatic spring strut temperatures may become elevated and it is desirable to equalize the gas pressure between the main pressure chamber and the secondary pressure chamber to prevent excessive gas pressure differentials therebetween and also to release the gas pressure from the pneumatic spring strut to prevent an excessive gas pressure differential between the interior of the strut and atmospheric pressure.

SUMMARY

In an exemplary embodiment a pneumatic spring strut assembly comprises a cylinder having a wall defining an interior volume comprising a working end and a boosting chamber adjacent to the working end. The working end includes a first volume of gas and the boosting chamber including a second volume of gas. A piston assembly is disposed for reciprocation in the working end of the interior volume with a piston rod having a proximal end secured to a piston and a distal end projecting out of a first end of the cylinder. A temperature control valve assembly is disposed in the interior volume separating the working end from the boosting chamber and includes an over-pressure valve configured to release the second volume of gas into the working end when the pressure within the boosting chamber increases above the normal pressure range of operation of the pneumatic spring strut assembly. A valve is disposed in the wall of the cylinder, in the working end thereof, and is configured to maintain a pressure seal throughout the normal pressure range of operation of the pneumatic spring strut assembly and to yield, to thereby vent the first volume of gas to atmosphere, when the pressure within the interior volume of the working end increases above the normal pressure range of operation and, to vent the second volume of gas from the boosting chamber when the over-pressure valve of the temperature control valve releases the second volume of gas to the interior volume of the working end.

In another exemplary embodiment an openable panel assembly having a pneumatic spring strut assembly comprises a cylinder having a wall defining an interior volume comprising a working end and a boosting chamber adjacent to the working end, the working end including a first volume of gas and the boosting chamber including a second volume of gas. A piston assembly is disposed for reciprocation in the working end of the interior volume with a piston rod having a proximal end secured to a piston and a distal end projecting out of a first end of the cylinder. A temperature control valve assembly is disposed in the interior volume separating the working end from the boosting chamber and includes an over-pressure valve configured to release the second volume of gas into the working end should the pressure within the boosting chamber increase above the normal pressure range of operation of the pneumatic spring strut assembly. A valve is disposed in the wall of the cylinder in the working end thereof and is configured to maintain a pressure seal throughout the normal pressure range of operation of the pneumatic spring strut assembly and to yield, to thereby vent the first volume of gas to atmosphere, should the pressure within the interior volume of the working end increase above the normal pressure range of operation and, to vent the second volume of gas from the boosting chamber when the over-pressure valve of the temperature control valve releases the second volume of gas to the interior volume of the working end.

The above features and advantages, and other features and advantages of the invention, are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
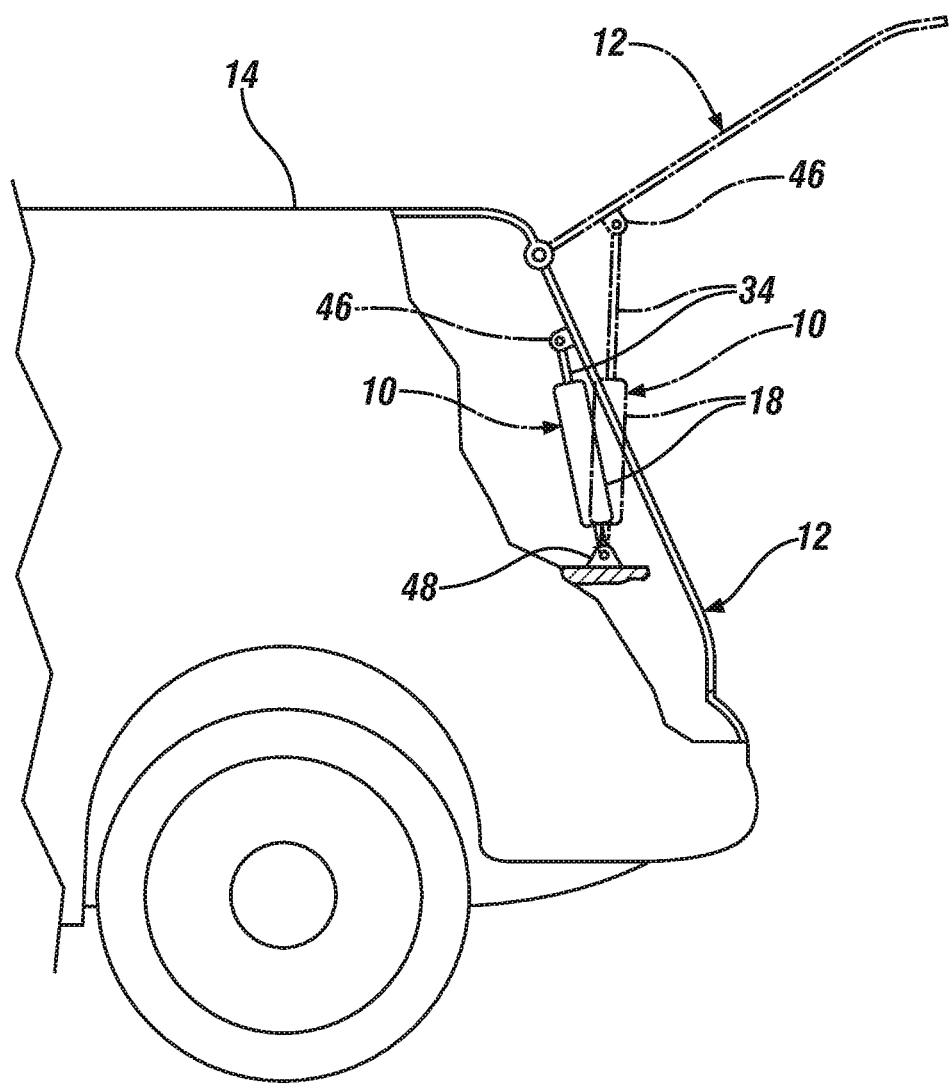
FIG. 1 is a partial schematic sectional view of a vehicle having an openable panel assembly embodying features of the invention.

The following description is merely exemplary in nature and is not intended to limit the present disclosure, its application or uses. It should be understood that throughout the drawings, corresponding reference numerals indicate like or corresponding parts and features. As used herein, the term vehicle is not limited to just an automobile, truck, van or sport utility vehicle, but includes any self-propelled or towed conveyance suitable for transporting a burden. The embodiments shown are applicable to vehicle components, but the system disclosed herein may be used in any suitable applications in which a pneumatic spring strut has application (ex. transportation, energy and aerospace applications, home appliance, home and particularly including many other types of vehicular components and applications).

Figure 2:
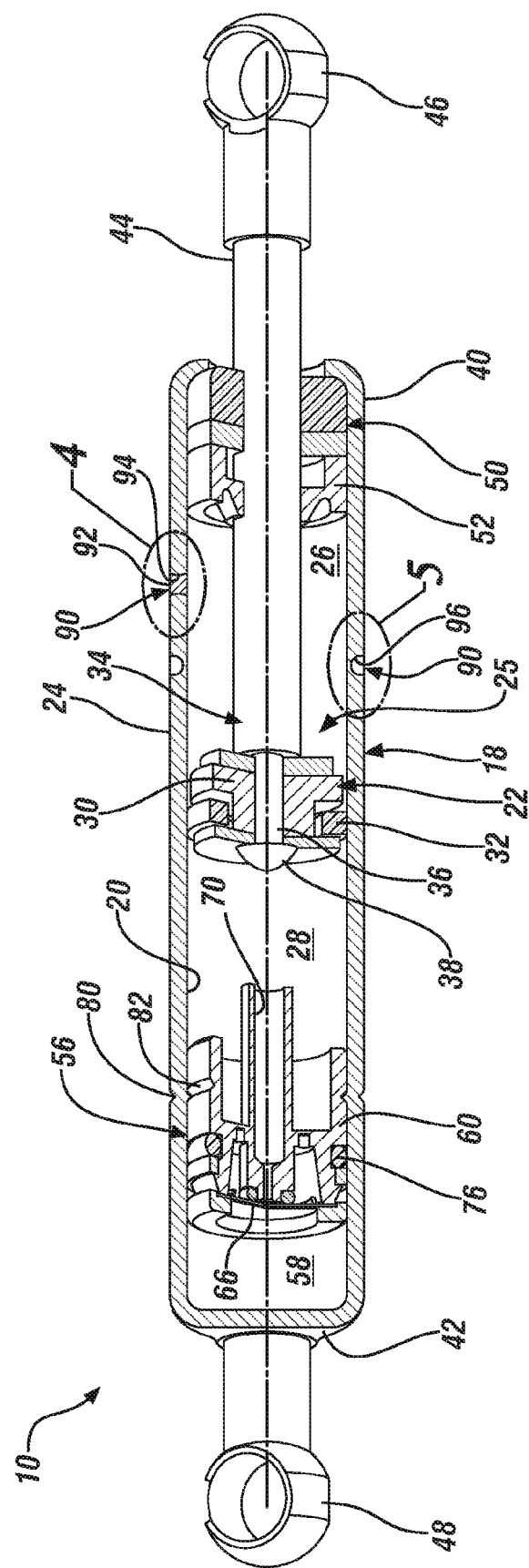
FIG. 2 is a sectional, plan view of a pneumatic spring strut embodying features of the invention.

Referring now to FIGS. 1 and 2, in an exemplary embodiment, a pneumatic spring strut assembly 10, for use in assisting with opening, and maintaining open, a panel 12, has a cylinder 18 having a cylinder wall 20 defining an interior volume 25. The length of cylinder 18 is determined by the type of equipment (ex. a panel 12 of a vehicle 14) with which the spring strut assembly 10 is to be used. A piston assembly 22 is disposed in the cylinder 18 for reciprocation at a first working end 24. The first working end 24 is separated by the piston assembly 22 into first and second compartments 26 and 28, respectively, and is filled with a first volume of gas (e.g., air, nitrogen or some other inert gas) under pressure. The piston assembly 22 may include a free-fitting piston 30, a piston ring 32 and a piston rod or shaft 34 secured at a first, proximal end 36 to the piston by swaging over or riveting at 38.

The piston shaft 34 projects out through a first end 40 of cylinder 18; the second end 42 of which is closed. The second, distal end 44 of piston shaft 34 has a first connector link 46 rigidly secured thereto and a second connector link 48 is fixed to the second end 42 of the cylinder 18. Within the cylinder 18 the piston shaft 34 passes through a large seal 50 and guide package 52. The first end 40 of the cylinder 18 is crimped about the seal 50 and guide package 52 and internal gas pressure helps to maintain the seal in position.

Figure 3:
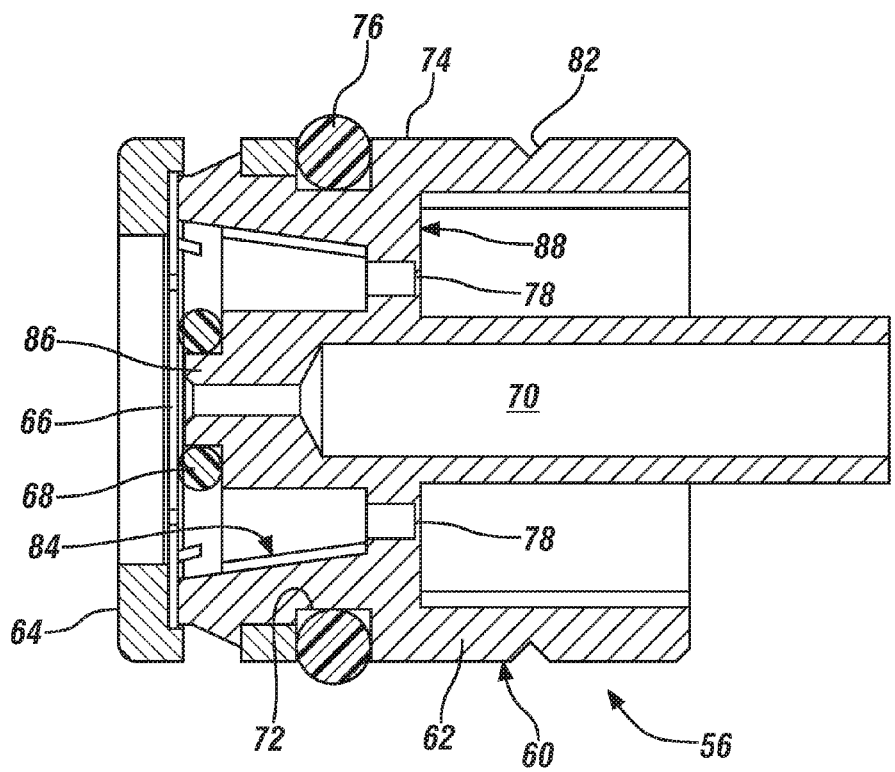
FIG. 3 is sectional view of a temperature control valve assembly embodying features of the invention.

Temperature compensation involves using a temperature control valve "TCV" assembly 56 to separate the first, working end 24 of the cylinder 18, within which the piston reciprocates and containing the first volume of gas under pressure, from an adjacent boosting chamber 58 containing a second volume of gas under pressure. Referring now to FIG. 3, with continuing reference to FIG. 2, the TCV assembly 56 comprises a partition wall bushing unit 60 which is fixed in a predetermined location inside of the cylinder 18 to define the aforementioned boosting chamber 58. The partition wall bushing unit, or bushing valve 60, may be constructed as shown in FIG. 3 and comprises a body 62 and a cap 64. A valve member 66 such as a bimetallic spring member is retained between the body 62 and the cap 64. An O-ring 68 is located below the bimetallic spring member 66 and seals the valve member 66, when the TCV assembly 56 is in the closed position, against a valve seat 86. In the open position (not shown), the bimetallic spring member 66 bends away from, and disengages from the O-ring 68 and valve seat 86 providing an opening to a hollow tube portion 70 which leads to compartment 28 of the working end 24 of the cylinder 18. When ambient temperatures decrease, the bimetallic spring member 66 curves away from, and disengages from, the O-ring 68 and valve seat 86 into the open position (not shown).

The TCV assembly 56 is assembled into the cylinder 18. As shown in FIG. 3 the body 62 comprises a seat 72 extending about the circumference of an outer wall 74 in which a second O-ring 76 is located. The second O-ring forms a seal with the cylinder wall 20 of the cylinder 18. The cylinder 18 may have a tube groove 80, FIG. 2, formed therein, typically following the insertion of the TCV assembly 56 into the cylinder. The tube groove 80 interfaces with a circumferentially extending retention notch 82 in the outer wall 74 and operates to maintain the TCV assembly 56 in place in the cylinder 18 and to form an additional seal with the cylinder wall 20 of the cylinder 18. In another embodiment (not shown) the TCV assembly 56 may be press-fit into the cylinder 18. An over pressure valve, such as engineered portion 78, is configured to prevent fluid flow between the working end 24 and the boosting chamber 58. In the event of a loss of the first volume of gas from the interior volume 25 of the working end 24 or, an extreme pressure differential between the first volume of gas in the interior volume 25 of the working end 24 and the boosting chamber 58, the engineered portion 78 will yield to permit fluid flow between the working end and the boosting chamber. Such an event may occur concurrently with, or subsequent to the loss of the first volume of gas.

Figure 4:
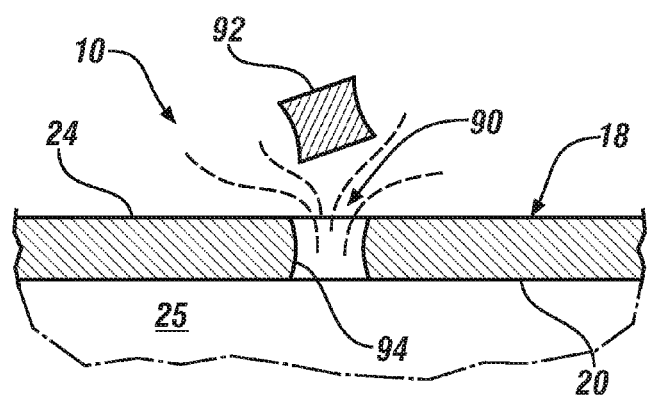
FIG. 4 is an enlarged portion of FIG. 2 taken at Circle 4.

In an embodiment, a valve 90 is disposed in the cylinder wall 20 of the cylinder 18 in the first working end 24 thereof. The valve may comprise one of a number of configurations such as a burst valve including an insert or plug 92, FIGS. 2 and 4, which is sealingly disposed in a through-hole 94 in the cylinder wall 20. The insert 92 is constructed of a metal, composite or other material suitable for the purpose that is selected to maintain a pressure seal throughout the normal pressure range of operation of the pneumatic spring strut assembly 10. Should the pressure within the interior volume 25 of the first working end 24 increase above the normal pressure range of operation of the pneumatic spring strut assembly 10, the insert 92 will yield from its sealing position in the through-hole 94 to thereby vent the first volume of gas to atmosphere. Concurrent or subsequent venting of the second volume of gas from the boosting chamber 58 to the interior volume 25 of the first working end 24 will also be released to atmosphere at the through-hole 94 thereby eliminating any over-pressure conditions in the cylinder 18.

Figure 5:
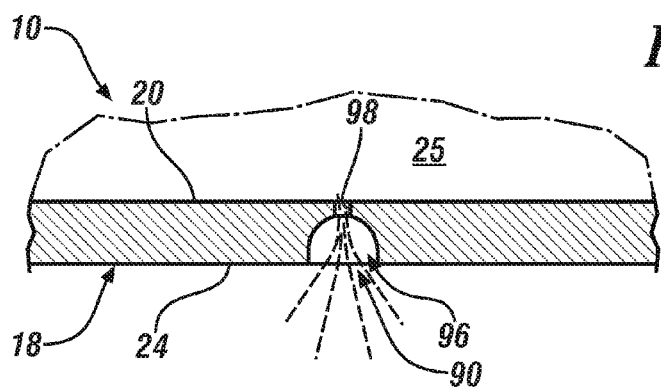
FIG. 5 is an enlarged portion of FIG. 2 taken at Circle 5.

In another embodiment, the valve 90 may comprise a groove, drilled indentation or other suitable engineered portion 96, FIGS. 2 and 5, that is formed in the cylinder wall 20 of the cylinder 18 in the first working end 24 thereof. The engineered portion 96 is configured to maintain a pressure seal throughout the normal range of operation of the pneumatic spring strut assembly 10. Should the pressure within the interior volume 25 of the first working end 24 increase above the normal pressure range of operation of the pneumatic spring strut assembly 10, the engineered portion will yield, thereby forming a vent-hole 98 to thereby release the first volume of gas to atmosphere. Concurrent or subsequent venting of the second volume of gas from the boosting chamber 58 to the interior volume of the first working end 24 will also be released to atmosphere at the vent-hole 98 thereby eliminating any over-pressure conditions in the cylinder 18.

In yet another embodiment, insert 92 is constructed of a metal, composite or other material suitable for the purpose, which is selected to maintain a pressure seal throughout the normal temperature range of operation of the pneumatic spring strut assembly 10. Should the temperature of the pneumatic spring strut assembly 10 increase above the normal range of operation, the insert 92 will soften and be ejected or melt from its sealing position in the through-hole 94 to thereby vent the first volume of gas to atmosphere. Concurrent or subsequent venting of the second volume of gas from the boosting chamber 58 to the interior volume 25 of the first working end 24 will also be released to atmosphere at the through-hole 94 thereby eliminating any overpressure conditions in the cylinder 18.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation of material to the teachings of the invention without departing from the essential scope thereof. Therefore, it is intended that the invention not be limited to the particular embodi-

What is claimed is:

1. A pneumatic spring strut assembly comprising:
   a cylinder having a wall defining an interior volume comprising a working end and a boosting chamber adjacent to the working end, the working end including a first volume of gas and the boosting chamber including a second volume of gas;
   a piston assembly disposed for reciprocation in the working end of the interior volume comprising a piston rod having a proximal end secured to a piston and a distal end projecting out of a first end of the cylinder;
   a temperature control valve assembly disposed in the interior volume separating the working end from the boosting chamber, the temperature control valve assembly including:
      a bushing valve having a body and a cap, the body defining a hollow tube that leads to a compartment of the working end,
      a spring member retained between the body and the cap, the spring member configured to selectively open and close an opening to the hollow tube, and
      an over-pressure valve, spaced apart from the hollow tube, the over-pressure valve being configured to release the second volume of gas into the working end when the pressure within the boosting chamber increases above a normal pressure range of operation of the pneumatic spring strut assembly; and
   a valve disposed in the wall of the cylinder in the working end thereof and configured to maintain a pressure seal throughout the normal pressure range of operation of the pneumatic spring strut assembly and to yield to thereby vent the first volume of gas to atmosphere when the pressure within the interior volume of the working end increases above the normal pressure range of operation and, to vent the second volume of gas from the boosting chamber when the over-pressure valve of the temperature control valve releases the second volume of gas to the interior volume of the working end.

2. The pneumatic spring strut assembly of claim 1, wherein the valve comprises one of an insert or a plug that is sealingly disposed in a through-hole in the wall of the cylinder and is yieldable from its sealing position in the through-hole under pressure.

3. The pneumatic spring strut assembly of claim 2, wherein the insert or plug is constructed of a metal.

4. The pneumatic spring strut assembly of claim 2, wherein the insert or plug is constructed of a composite material.

5. The pneumatic spring strut assembly of claim 1, wherein the valve comprises an engineered portion that is formed in the wall of the cylinder and is yieldable to form a vent-hole therein.

6. The pneumatic spring strut assembly of claim 5, wherein the engineered portion comprises one of a groove or a drilled indentation.

7. The pneumatic spring strut assembly of claim 2, wherein the insert or plug is constructed of a material that maintains a pressure seal throughout a normal temperature range of operation of the pneumatic spring strut assembly and softens and is ejected or melts from its sealing position in the through-hole, at temperatures above the normal temperature range of operation.

* * * * *